(12) United States Patent
Fujita

(10) Patent No.: US 9,182,761 B2
(45) Date of Patent: Nov. 10, 2015

(54) AUTONOMOUS DRIVING CONTROL SYSTEM FOR VEHICLE

(75) Inventor: Susumu Fujita, Atsugi (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/238,342

(22) PCT Filed: Aug. 23, 2012

(86) PCT No.: PCT/JP2012/071340
§ 371 (c)(1),
(2), (4) Date: Feb. 11, 2014

(87) PCT Pub. No.: WO2013/027803
PCT Pub. Date: Feb. 28, 2013

(65) Prior Publication Data
US 2014/0222278 A1 Aug. 7, 2014

(30) Foreign Application Priority Data
Aug. 25, 2011 (JP) ................................. 2011-183363

(51) Int. Cl.
*G01C 22/00* (2006.01)
*G05D 1/00* (2006.01)
(Continued)

(52) U.S. Cl.
CPC ............. *G05D 1/0212* (2013.01); *B60W 30/09* (2013.01); *B60W 2550/302* (2013.01); *B60W 2550/306* (2013.01); *G08G 1/165* (2013.01); *G08G 1/166* (2013.01)

(58) Field of Classification Search
CPC .......... G05D 2201/0213; G05D 13/00; G05D 1/021; G05D 1/27; G05D 1/214; G05D 1/07; G05D 1/024; G05D 1/02; G05D 11/006; G01S 2013/9346; G01S 13/931; G01S 13/86; G08G 1/0962; G08G 1/165; G08G 1/166; G08G 1/167; G08G 1/164; G08G 1/22; B60W 2550/302; B60W 10/20; B60W 30/10; B60W 10/16; B60W 30/12; B60W 40/04; B60W 40/08
USPC ........... 701/36, 1, 117, 428, 2, 24, 25, 70, 26, 701/28, 300, 410, 411
See application file for complete search history.

(56) References Cited

U.S. PATENT DOCUMENTS 5,999,865 A * 12/1999 Bloomquist et al. ............. 701/25
6,370,475 B1 * 4/2002 Breed et al. .................... 701/301
(Continued)

FOREIGN PATENT DOCUMENTS

| JP | 08-287395 A | 11/1996 |
|---|---|---|
| JP | 2002036908 A | 2/2002 |

(Continued)

OTHER PUBLICATIONS

Official Action dated Mar. 10, 2015 from the counterpart Japanese Patent Application No. 2013-530060, with English translation.

*Primary Examiner* — Calvin Cheung
*Assistant Examiner* — Luis A Martinez Borrero
(74) *Attorney, Agent, or Firm* — Young Basile

(57) ABSTRACT

Information regarding a vehicle is acquired by a vehicle information acquisition unit provided in the vehicle, and an object to be avoided is detected by an avoidance-target object detection unit. On the basis of the vehicle information and the distance and angle of the object to be avoided, the location and amount of movement of the object to be avoided are calculated by a peripheral information recognition unit, and the calculation accuracy of the location and amount of movement of the object to be avoided are determined by a driving maneuver determination unit. On the basis of the calculation accuracy of the location and amount of movement of the object to be avoided, a driving maneuver for avoiding the object to be avoided is determined, and autonomous driving control is implemented in accordance with the driving maneuver that is determined.

15 Claims, 10 Drawing Sheets

(51) Int. Cl.
*G05D 1/02* (2006.01)
*B60W 30/09* (2012.01)
*G08G 1/16* (2006.01)

(56) References Cited

U.S. PATENT DOCUMENTS

| | | | | |
|---|---|---|---|---|
| 6,405,132 | B1* | 6/2002 | Breed et al. | 701/301 |
| 6,882,910 | B2* | 4/2005 | Jeong | 701/23 |
| 6,904,343 | B2* | 6/2005 | Kang | 701/23 |
| 6,941,200 | B2* | 9/2005 | Sonoyama et al. | 701/23 |
| 7,991,521 | B2* | 8/2011 | Stewart | 701/23 |
| 8,209,090 | B2* | 6/2012 | Arbitmann et al. | 701/41 |
| 8,437,890 | B2* | 5/2013 | Anderson et al. | 701/3 |
| 8,442,739 | B2* | 5/2013 | Kuge et al. | 701/96 |
| 8,594,380 | B2* | 11/2013 | Sakurai | 382/104 |
| 8,616,320 | B2* | 12/2013 | Frank et al. | 180/169 |
| 8,718,919 | B2* | 5/2014 | Leineweber et al. | 701/301 |
| 8,751,147 | B2* | 6/2014 | Colwell | 701/408 |
| 8,849,515 | B2* | 9/2014 | Moshchuk et al. | 701/42 |
| 8,868,325 | B2* | 10/2014 | Morotomi et al. | 701/301 |
| 9,081,387 | B2* | 7/2015 | Bretzigheimer et al. | 1/1 |
| 2002/0022927 | A1* | 2/2002 | Lemelson et al. | 701/301 |
| 2002/0042676 | A1* | 4/2002 | Furusho | 701/300 |
| 2004/0090117 | A1* | 5/2004 | Dudeck et al. | 303/191 |
| 2005/0021195 | A1* | 1/2005 | Zeitler et al. | 701/23 |
| 2005/0216182 | A1* | 9/2005 | Hussain et al. | 701/200 |
| 2007/0179690 | A1* | 8/2007 | Stewart | 701/23 |
| 2008/0097699 | A1* | 4/2008 | Ono | 701/300 |
| 2009/0138151 | A1* | 5/2009 | Smid et al. | 701/27 |
| 2009/0192710 | A1* | 7/2009 | Eidehall et al. | 701/301 |
| 2009/0276111 | A1* | 11/2009 | Wang et al. | 701/23 |
| 2010/0010723 | A1* | 1/2010 | Taki et al. | 701/102 |
| 2011/0035150 | A1* | 2/2011 | Sundarraj et al. | 701/301 |
| 2011/0095879 | A1* | 4/2011 | Heracles et al. | 340/441 |
| 2011/0282581 | A1* | 11/2011 | Zeng | 701/301 |
| 2011/0313664 | A1* | 12/2011 | Sakai et al. | 701/301 |
| 2012/0083947 | A1* | 4/2012 | Anderson et al. | 701/3 |
| 2012/0253582 | A1* | 10/2012 | Chrysanthakopoulos et al. | 701/26 |
| 2013/0030686 | A1* | 1/2013 | Morotomi et al. | 701/301 |
| 2013/0054128 | A1* | 2/2013 | Moshchuk et al. | 701/301 |
| 2013/0124041 | A1* | 5/2013 | Belser et al. | 701/41 |
| 2013/0297172 | A1* | 11/2013 | Ariga et al. | 701/70 |
| 2013/0325306 | A1* | 12/2013 | Caveney et al. | 701/117 |
| 2014/0222289 | A1* | 8/2014 | Fujishiro | 701/41 |
| 2015/0161894 | A1* | 6/2015 | Duncan et al. | 701/1 |
| 2015/0177007 | A1* | 6/2015 | Su et al. | 701/1 |

FOREIGN PATENT DOCUMENTS

| | | |
|---|---|---|
| JP | 2005-050187 A | 2/2005 |
| JP | 2007-255979 A | 10/2007 |
| JP | 2008-008679 A | 1/2008 |
| JP | 2010286926 A | 12/2010 |

* cited by examiner

FIG. 3

| | MOVING AMOUNT OF OBJECT | | POSITION OF OBJECT | | DETAILS OF STRATEGY |
|---|---|---|---|---|---|
| | FAR DISTANCE | NEAR DISTANCE | FAR DISTANCE | NEAR DISTANCE | |
| DRIVING STRATEGY 4 | ○ | ○ | ○ | ○ | AVOID EVERY OBJECT AS OBJECT THAT MOVES AT DETECTED SPEED |
| DRIVING STRATEGY 3 | × | ○ | ○ | ○ | AVOID LIKE DRIVING STRATEGY 2 AND AVOID FAR-DISTANCE OBJECT AS STATIONARY OBJECT |
| DRIVING STRATEGY 2 | × | ○ | × | ○ | AVOID NEAR-DISTANCE OBJECT AS OBJECT THAT MOVES AT DETECTED SPEED |
| DRIVING STRATEGY 1 | × | × | × | ○ | AVOID NEAR-DISTANCE OBJECT AS OBJECT THAT APPROACHES AT PREDETERMINED SPEED |

(○: HIGH ACCURACY)
(×: LOW ACCURACY)

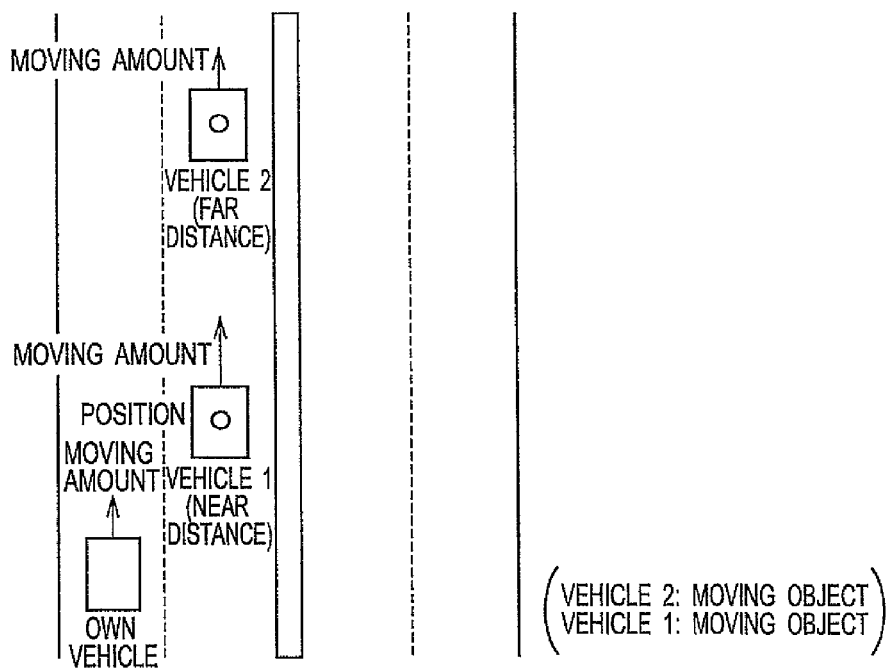

FIG. 4

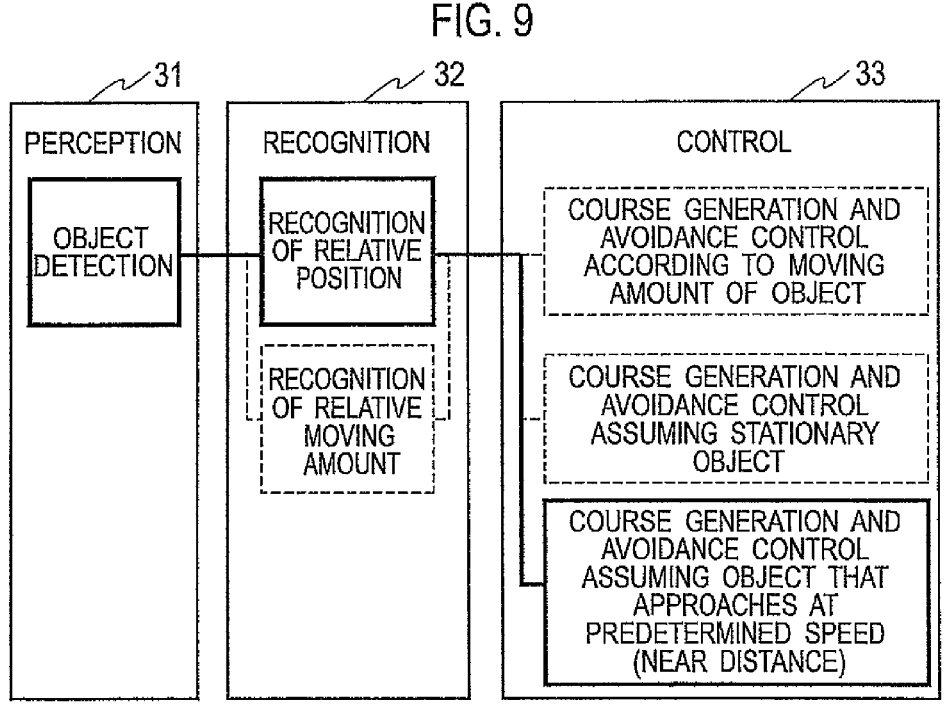
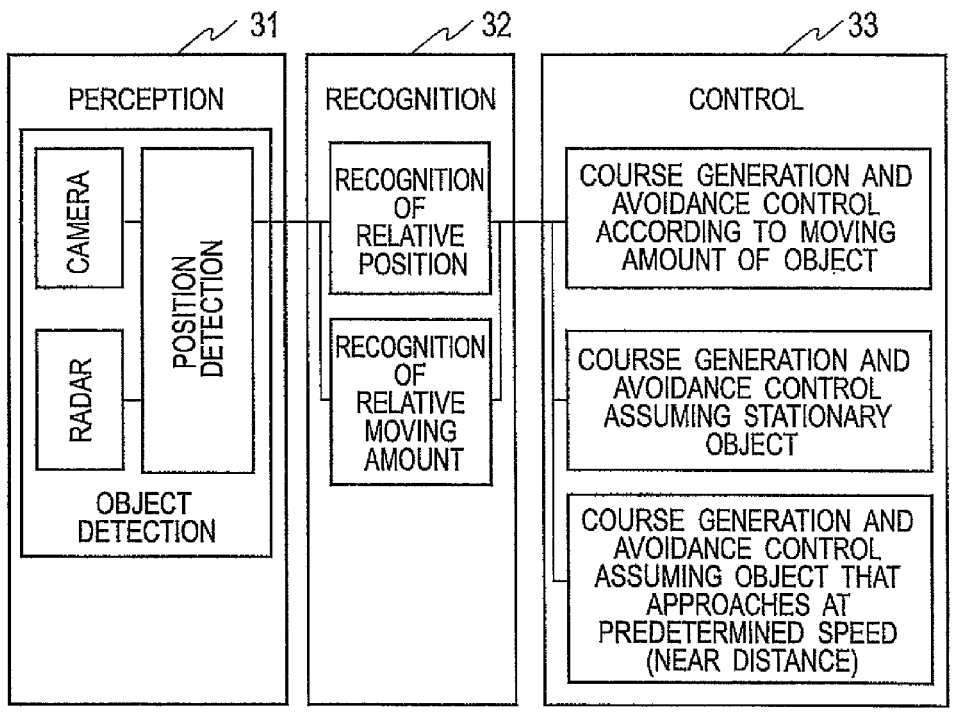

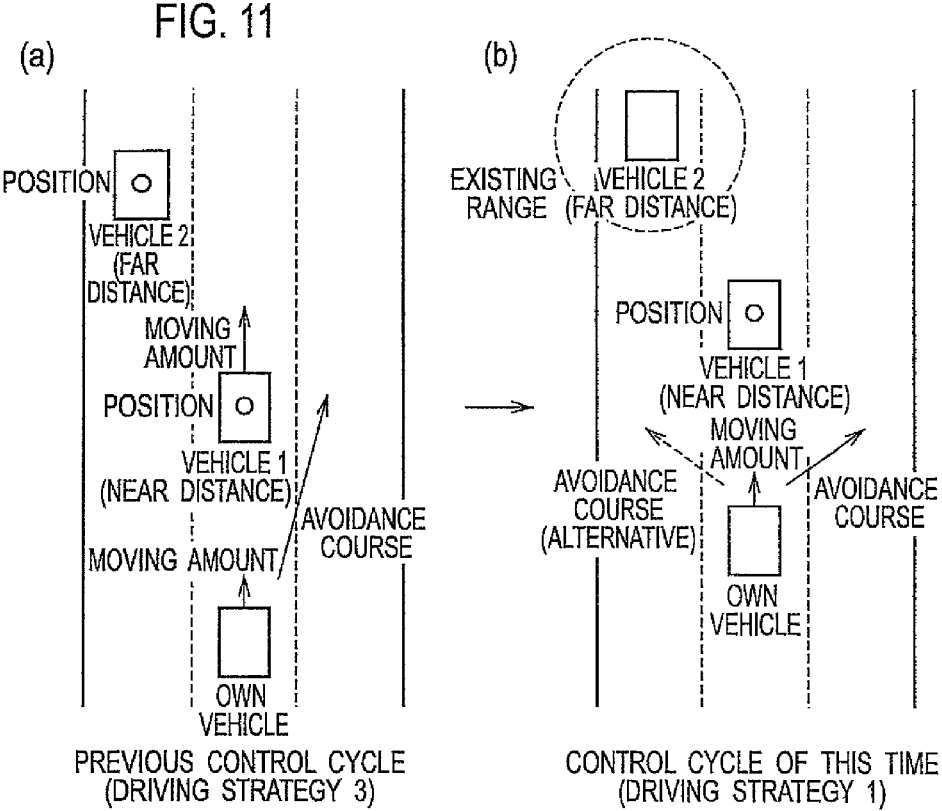
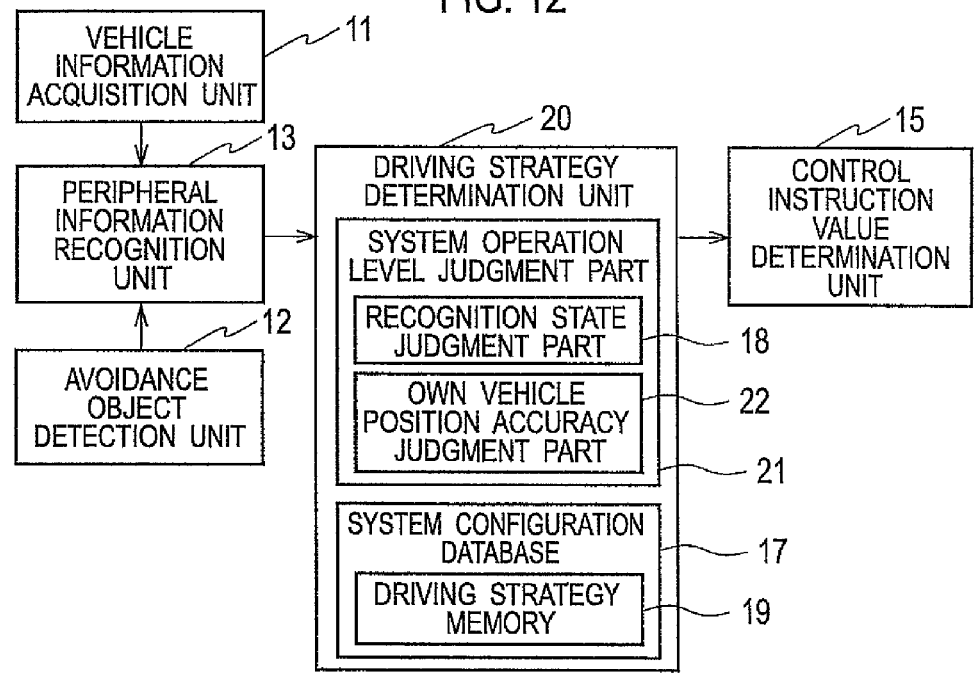

FIG. 14 (POSITION ESTIMATED ACCORDING TO PREVIOUS POSITION, MOVING AMOUNT, AND STEERING ANGLE OF OWN VEHICLE)

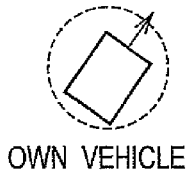
OWN VEHICLE

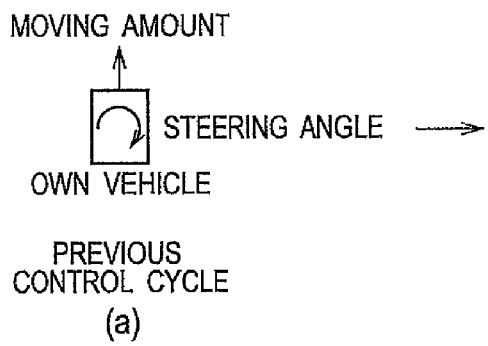

MOVING AMOUNT

STEERING ANGLE →

OWN VEHICLE

PREVIOUS CONTROL CYCLE
(a)

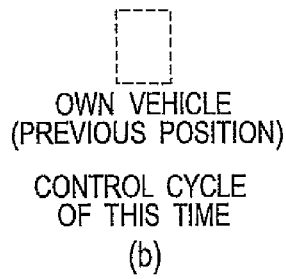

OWN VEHICLE (PREVIOUS POSITION)

CONTROL CYCLE OF THIS TIME
(b)

FIG. 15

|  | ACCURACY OF OWN VEHICLE POSITION | MOVING AMOUNT OF OBJECT | | POSITION OF OBJECT | |
|---|---|---|---|---|---|
|  |  | FAR DISTANCE | NEAR DISTANCE | FAR DISTANCE | NEAR DISTANCE |
| DRIVING STRATEGY 4-2 | ○ | ○ | ○ | ○ | ○ |
| DRIVING STRATEGY 4-1 | × | | | | |
| DRIVING STRATEGY 3-2 | ○ | × | ○ | ○ | ○ |
| DRIVING STRATEGY 3-1 | × | | | | |
| DRIVING STRATEGY 2-2 | ○ | × | ○ | × | ○ |
| DRIVING STRATEGY 2-1 | × | | | | |
| DRIVING STRATEGY 1-2 | ○ | × | × | × | ○ |
| DRIVING STRATEGY 1-1 | × | | | | |

(○: HIGH ACCURACY)
(×: LOW ACCURACY)

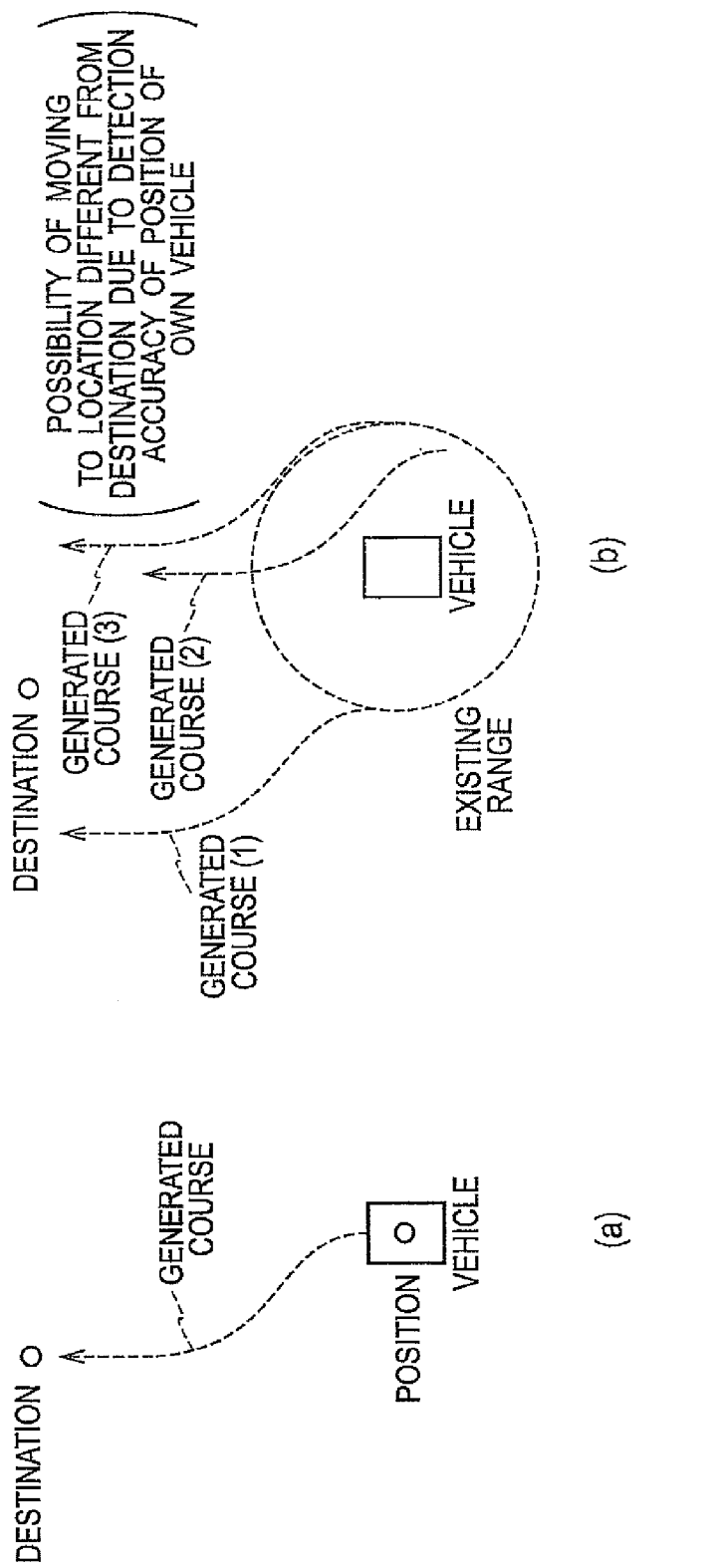

AUTONOMOUS DRIVING CONTROL SYSTEM FOR VEHICLE

CROSS REFERENCE TO RELATED APPLICATION

The present application claims priority to Japanese Patent Application No. 2011-183363, filed Aug. 25, 2011, incorporated herein in its entirety.

TECHNICAL FIELD

The present invention relates to an autonomous driving control system for a vehicle, for determining a course to be taken by the vehicle and carrying out autonomous driving control.

BACKGROUND ART

Japanese Unexamined Patent Application Publication No. H08-287395 describes a technique that, when conducting automatic driving control for a vehicle by sensing actual road conditions in a traveling direction of the vehicle, correlatively improves the accuracy of a present position and the accuracy of driving control so as to highly accurately carry out the automatic driving control.

SUMMARY OF INVENTION

A driving guidance apparatus of the above-mentioned related art determines an avoidance course to avoid an obstacle and a driving course without considering the detection accuracy of the obstacle. As a result, it may cause problems such as that the determined driving course is inappropriate for the vehicle that is running, to increase a probability of hindering the driving guidance.

The present invention has been made in consideration of the above-mentioned problems and provides an autonomous driving control system for a vehicle, capable of increasing a possibility of conducting autonomous driving control suitable for driving environments.

According to a technical aspect of the present invention, the autonomous driving control system for a vehicle is characterized in that it detects a position of the vehicle and a position of an avoidance object existing around the vehicle, determines a course to be taken by the vehicle to a destination, carries out autonomous driving control, and according to a distance between the vehicle and the avoidance object and computation accuracy levels of the position and moving amount of the avoidance object, determines a driving strategy to avoid the avoidance object.

BRIEF DESCRIPTION OF DRAWINGS

The description herein makes reference to the accompanying drawings wherein like reference numerals refer to like parts throughout the several views, and wherein:

FIG. 3 is a view illustrating driving strategies according to Embodiment 1 of the present invention.

FIG. 4 is a view illustrating an example of a peripheral condition around an own vehicle when executing a driving strategy 4 according to Embodiment 1 of the present invention.

FIG. 9 is a view illustrating a system configuration to execute the driving strategy 1.

FIG. 10 is a view illustrating a hardware system configuration to execute the driving strategies.

FIG. 11 is a view illustrating consistency between avoidance courses when a system configuration for executing a driving strategy is changed to another.

FIG. 12 is a view illustrating a configuration of an autonomous driving control system for a vehicle according to Embodiment 2 of the present invention.

FIG. 14 is a view illustrating a technique of estimating the detection accuracy of an own vehicle position.

FIG. 15 is a view illustrating driving strategies according to Embodiment 2 of the present invention.

FIG. 16 is a view illustrating different courses to a destination depending on the detection accuracy of an own vehicle position.

DETAILED DESCRIPTION OF THE EMBODIMENTS

Embodiments of the present invention will be explained with reference to the drawings.

Embodiment 1

Figure 1:
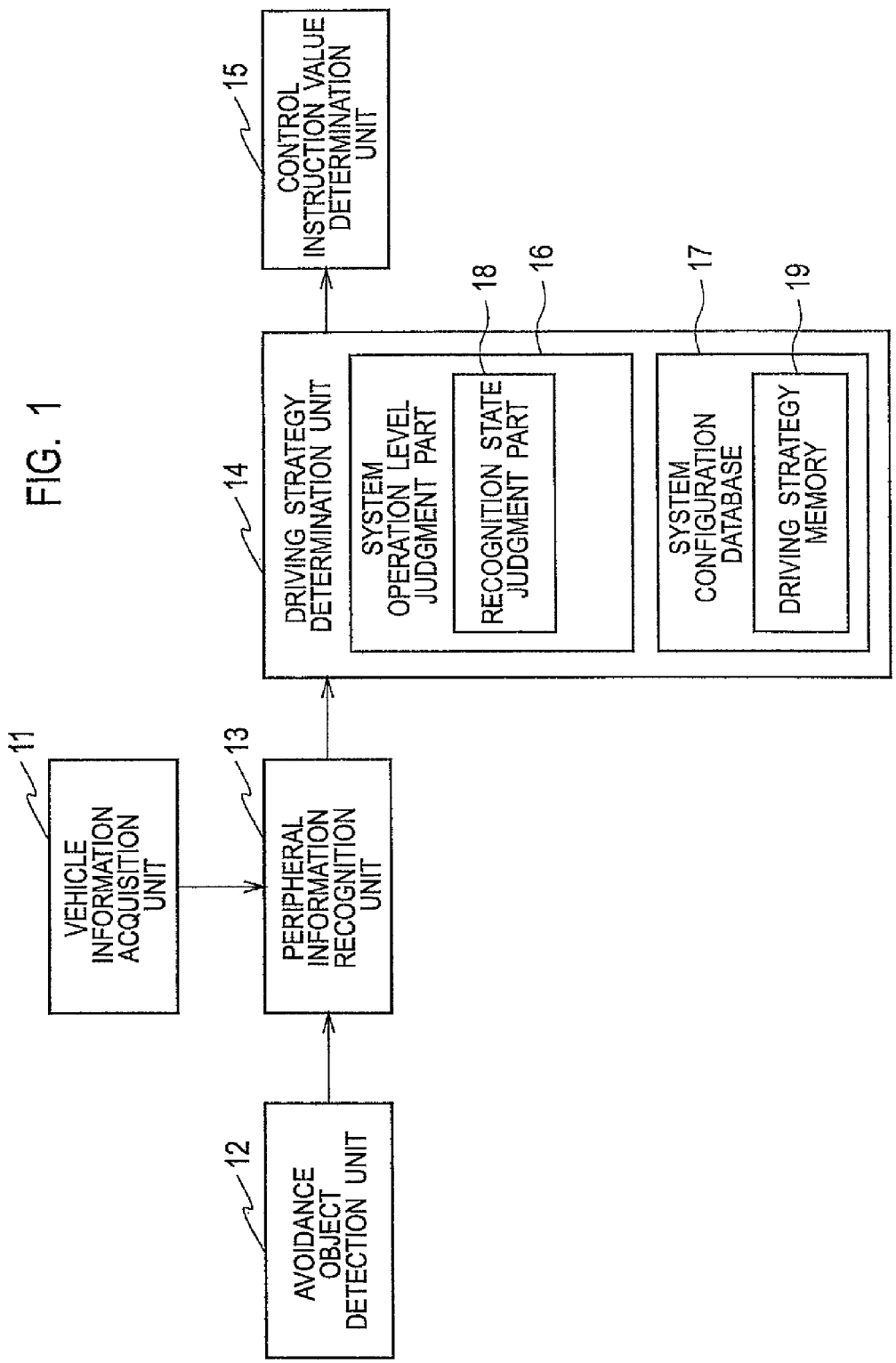
FIG. 1 is a view illustrating a configuration of an autonomous driving control system for a vehicle according to Embodiment 1 of the present invention.

FIG. 1 is a view illustrating a configuration of an autonomous driving control system for a vehicle according to Embodiment 1 of the present invention. The system according to Embodiment 1 illustrated in FIG. 1 detects an avoidance object (such as a vehicle that is running) around the own vehicle and recognizes the relative position and relative moving amount of the avoidance object. After the recognition, the system chooses a system that is able to execute a driving strategy suitable for a recognition level and avoids the avoidance object.

To realize these functions, the system includes, as illustrated in FIG. 1, a vehicle information acquisition unit 11, an avoidance object detection unit 12, a peripheral information recognition unit 13, a driving strategy determination unit 14, and a control instruction value determination unit 15. The driving strategy determination unit 14 includes a system operation level judgment part 16 and a system configuration database 17. The system operation level judgment part 16 includes a recognition state judgment part 18. The system configuration database 17 includes a driving strategy memory 19.

The system is realized by a computer, such as a microcomputer having resources such as a CPU, a storage device, and an input/output device to control various operation processes according to programs. The system reads signals from sensors to detect vehicle information and an avoidance object, and according to the read signals and control logics (programs) stored in advance, determines a driving strategy to carry out autonomous driving control.

With the configuration mentioned above, the system recognizes the relative position and relative moving amount of an avoidance object existing around the own vehicle, figures out a driving danger level of the own vehicle, and conducts avoidance control suitable for the actual driving scene. Driving control carried out at this time will be explained. The system stores a program for obtaining vehicle information, a program for detecting an avoidance object existing around the own vehicle, and a program for recognizing a running course of the own vehicle and a moving amount of the avoidance object. The system also stores a program for determining a driving strategy and a program for determining a control instruction value to conduct avoidance control for the vehicle. These programs are executed and processed by hardware such as a computer CPU to realize the above-mentioned functional units and parts. Namely, the system realizes the autonomous driving control with a combination of computer software and hardware resources.

The vehicle information acquisition unit 11 acquires at least the position, speed, and steering angle of the own vehicle. The avoidance object detection unit 12 detects an avoidance object from among objects existing around the own vehicle and finds a distance and an angle between the detected avoidance object and the own vehicle.

The peripheral information recognition unit 13 recognizes a driving course the own vehicle may follow. The peripheral information recognition unit 13 refers to the position of the own vehicle acquired by the vehicle information acquisition unit 11 and the distance and angle between the avoidance object and the own vehicle detected by the avoidance object detection unit 12 and computes the position of the avoidance object with respect to the own vehicle. According to the computed position of the avoidance object and the speed and steering angle acquired by the vehicle information acquisition unit 11, the peripheral information recognition unit 13 computes a moving amount of the own vehicle. According to the computed position of the avoidance object and computed moving amount of the own vehicle, the peripheral information recognition unit 13 computes a moving amount of the avoidance object.

The driving strategy determination unit 14 compares the distance between the own vehicle and the avoidance object with a distance threshold, checks to see if the position of the avoidance object has been directly obtained, and determines a computation accuracy of the position of the avoidance object. The distance threshold is preset as a judgment value to judge a computation accuracy level of the position of the avoidance object. The driving strategy determination unit 14 judges, according to the computation accuracy level of the position of the avoidance object and the computation accuracy of the moving amount of the own vehicle, a computation accuracy level of the moving amount of the avoidance object. The driving strategy determination unit 14 determines, according to the computation accuracy levels of the position and moving amount of the avoidance object, a driving strategy that specifies driving control to avoid the avoidance object.

The driving strategy determination unit 14 has the system operation level judgment part 16 and system configuration database 17. The system operation level judgment part 16 judges and determines, according to the computation accuracy levels of the position and moving amount of the avoidance object, a system configuration to achieve autonomous driving control.

The system operation level judgment part 16 has the recognition state judgment part 18 to judge a recognition state of the avoidance object. If the position of the avoidance object has directly been obtained and if the avoidance object and own vehicle have been detected at a distance shorter than the above-mentioned distance threshold, the recognition state judgment part 18 judges that the computation accuracy of the position of the avoidance object is high. If the position of the avoidance object has not directly been obtained and if the avoidance object and own vehicle have been detected at a distance equal to or greater than the distance threshold, the recognition state judgment part 18 judges that the computation accuracy of the position of the avoidance object is low.

If it is determined that the computation accuracy of the position of the avoidance object and that of the moving amount of the own vehicle are each high, the recognition state judgment part 18 judges that the computation accuracy of the moving amount of the avoidance object is high. If it is determined that at least one of the computation accuracy of the position of the avoidance object and that of the moving amount of the own vehicle is low, the recognition state judgment part 18 judges that the computation accuracy of the moving amount of the avoidance object is low. If the own vehicle is driving not on a slippery road, the recognition state judgment part 18 judges that the detection accuracy of the moving amount of the own vehicle is high, and if the own vehicle is driving on a slippery road, judges that the detection accuracy of the moving amount of the own vehicle is low.

The system configuration database 17 has the driving strategy memory 19 that stores driving strategies corresponding to at least the computation accuracy levels of the positions and moving amounts of an avoidance object.

The driving strategy memory 19 stores driving strategies corresponding to at least the computation accuracy levels of the positions and moving amounts of an avoidance object. The driving strategy memory 19 stores driving strategies each to avoid an avoidance object at the timing determined by a predetermined collision time (TTC) and vehicle-to-vehicle time interval (THW) based on the recognition state of a moving amount of the avoidance object.

The control instruction value determination unit 15 determines and outputs a control instruction value so that autonomous driving control corresponding to the driving strategy determined by the driving strategy determination unit 14 is carried out on the own vehicle. If the driving strategy determined by the driving strategy determination unit 14 is changed and if control instruction values corresponding to a plurality of driving strategy candidates for the change include one that contains a motion vector similar to a motion vector contained in the control instruction value of the driving strategy executed before the change, the control instruction value determination unit 15 selects the one containing the similar motion vector.

Figure 2:
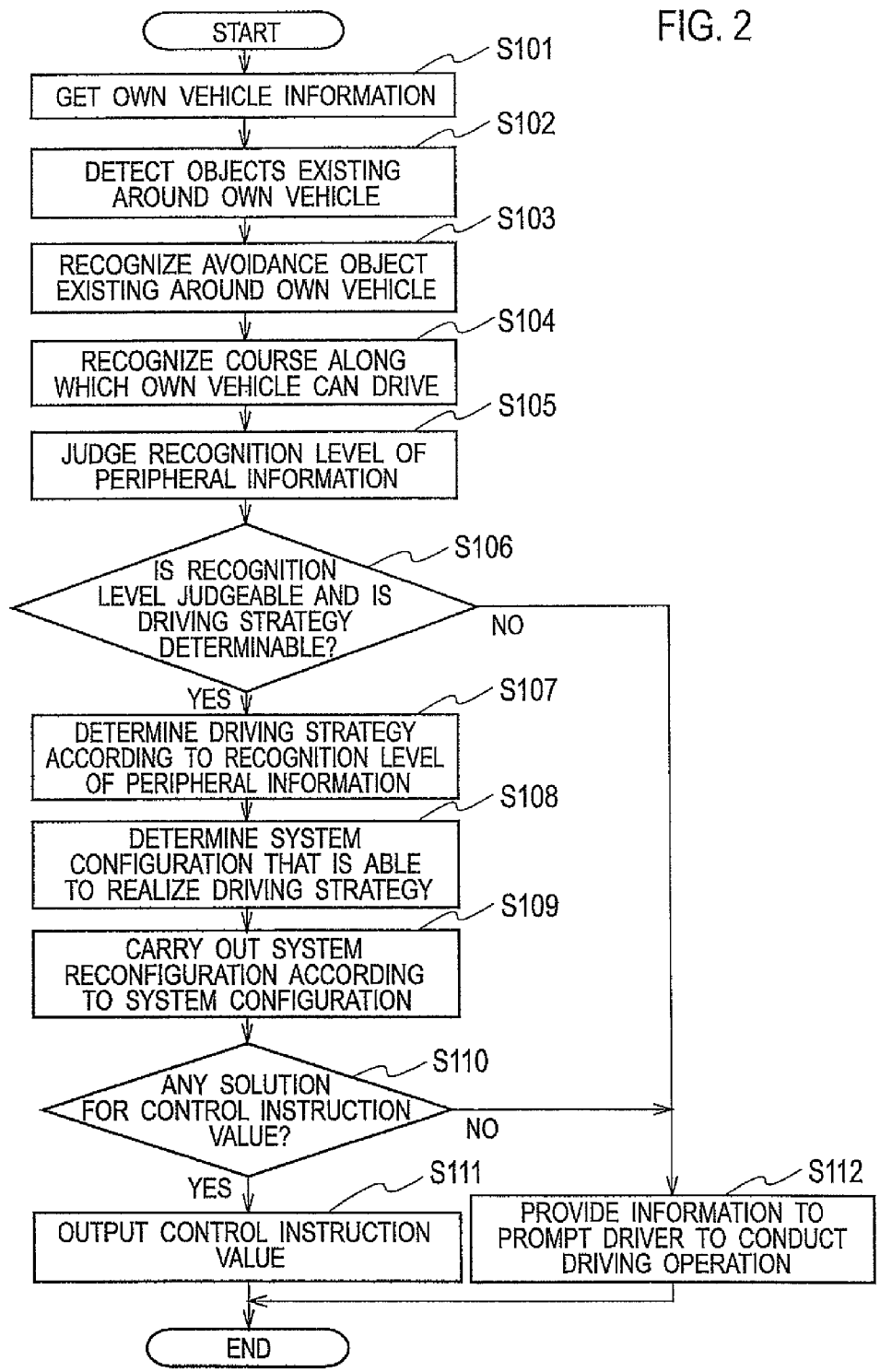
FIG. 2 is a flowchart illustrating a sequence of driving control processes according to Embodiment 1 of the present invention.

With reference to the flowchart of FIG. 2, an autonomous driving control sequence according to Embodiment 1 will be explained. In FIG. 2, steps S101 and S102 acquire information about the own vehicle and detect an object existing around the own vehicle. Steps S103 and S104 recognize peripheral information around the own vehicle. Steps S105 to S108 judge a recognition level of the peripheral information of the own vehicle, select and determine a driving strategy to execute, and configure a system capable of executing the driving strategy. Step S109 determines, according to a control instruction value computed by the configured system, a final control instruction value to be used to control the own vehicle.

As a concrete example, avoidance control to be carried out based on the recognition level of an avoidance object and a system configured to realize the avoidance control will be explained. In FIG. 2, vehicle information about the own vehicle is obtained (step S101). The information about the own vehicle includes the position, speed, and steering angle of the own vehicle. The position of the own vehicle is obtained with GPS (Global Positioning System) and a gyro sensor installed in the own vehicle. The speed of the own vehicle is obtained with a speed sensor installed in the own vehicle. The steering angle of the own vehicle is obtained with a steering encoder installed in the own vehicle.

An object existing around the own vehicle is detected in step S102. To detect an object, effective techniques include a known distance measurement using a radar and an analysis of images taken around the vehicle with a vehicle-mounted camera. These techniques scan and detect an object existing around the vehicle. If the own vehicle and another vehicle each have a high-speed, low-delay radio communication device, it is possible to highly accurately recognize the position of each through mutual communication. This enables detecting an object existing around the own vehicle as well as an object existing at a relatively long distance. The information obtained at this time is at least distance information and angular information about the object. If a camera is used to detect an object, an image taken by the camera will provide the feature point, grayscale information, texture information, and the like of the object, and therefore, will effectively be used to recognize an avoidance object to be explained later.

An avoidance object existing around the own vehicle is recognized in step S103. An example of this will be explained. If a scanning radar is used, relative distance information and relative angle information about an avoidance object existing around the own vehicle will be obtained. These pieces of information are used to compute relative coordinates (relative position) of the avoidance object with respect to the own vehicle. According to the speed and steering angle of the own vehicle, a moving amount of the own vehicle is computed. Subtracting the moving amount of the own vehicle from the relative coordinates of the avoidance object results in computing a relative moving amount of the avoidance object. As a result, the relative moving amount of the avoidance object is recognized.

If a camera is used, the magnitude of a movement (optic flow) of a feature point in an image is computed, and with the use of the moving amount of the own vehicle, a relative moving amount of the avoidance object is computed. As a result, the relative moving amount of the avoidance object is recognized. The image information and grayscale information may be used to detect the shape of the avoidance object and judge the kind (vehicle, human, road facilities such as a guardrail, and the like) of the avoidance object.

A driving course the own vehicle can take is recognized in step S104. The minimum required information about the driving course is lane information. It is possible to use a camera to recognize a lane. If a lane is recognized, it is determined that a driving course is recognized. If no lane is recognized, it is determined that no driving course is recognized. It is possible to use a car navigation system of the own vehicle to map the position of the own vehicle. If the own vehicle is mapped on a road, it is determined that a driving course is recognized. If the own vehicle is not mapped on a road, it is determined that no driving course is recognized.

A recognition level of the peripheral information of the own vehicle is judged in step S105. The peripheral information means information about the avoidance object and information about the driving course. A recognition level of the avoidance object will be explained. The avoidance object may exist at a near or far distance from the own vehicle. The definitions of the near and far distances may be preset as, for example, system design items. If a radar of detecting an avoidance object has resolutions of 30-to-60 (m) range and 100-to-200 (m) range, a threshold (distance threshold) to distinguish the near and far distances from each other is set to a value in the range of, for example, about 60 m to 100 m.

If there is an object at the near distance, the size of the object to be detected will be large and a distance measurement result will be correct (highly accurate). If there is an object at the far distance, the size of the object to be detected will be small and a distance measurement result will contain a large error (low accuracy). Accordingly, for the object existing at the near distance, a moving amount will correctly be computed, and for the object existing at the far distance, a moving amount will hardly be computed at the same correctness as the object existing at the near distance.

However, if radio communication is utilized, information of each vehicle is directly obtainable, and therefore, even the relative position and relative moving amount of an object existing at the far distance is correctly obtainable. The accuracy of a moving amount of the own vehicle differs depending on peripheral conditions. For example, on a slippery road, an actual vehicle speed may be different from a vehicle speed from a speed sensor. In this case, a technique of detecting a slipping state with a slip sensor of the vehicle or a technique of comparing the value of the speed sensor with a vehicle speed obtained from GPS may be used to estimate the detection accuracy of the vehicle speed. The steering angle also involves similar problems, and therefore, the detection accuracy of the steering angle is estimated like the vehicle speed.

It is determined whether or not a recognition level (recognition state) of the peripheral information can be judged to determine a driving strategy in step S106. If, as a result of the judgment, the peripheral information recognition level can be judged to determine a driving strategy, a driving strategy is determined according to the peripheral information recognition level (step S107). If the peripheral information recognition level is unable to judge or if a driving strategy is unable to determine, it is determined that autonomous driving control by this system is hardly carried out. In this case, information is provided to prompt the driver to conduct a driving operation on his/her own (step S112).

The technique of determining a driving strategy according to a peripheral information recognition level will be explained. The system configuration database 17 stores in advance driving strategies 1 to 4 illustrated in FIG. 3 corresponding to recognition levels and system configurations to realize the driving strategies 1 to 4. The system configurations include the details of perception, recognition, and control function blocks to realize the driving strategies and connection relationships of the function blocks.

To simplify explanation for easy understanding, recognition of an avoidance object with the use of a vehicle-mounted radar such as a millimeter-wave radar will be explained. The driving strategies 1 to 4 are defined according to recognition levels (the detection accuracy of a relative position and the computation accuracy of a relative moving amount) of the avoidance object. According to a recognition state of the moving amount of the avoidance object, each of the driving strategies 1 to 4 avoids the avoidance object at the timing determined by a preset collision time (FTC) and vehicle-to-vehicle time interval (THW). The details of this will be explained.

An example of judging a recognition level, i.e. the computation accuracy of a relative position and the computation accuracy of a relative moving amount, of the avoidance object will be explained. In connection with the computation accuracy of the position of the avoidance object, it is first determined whether or not the position of the avoidance object has directly been obtained through communication between the own vehicle and the avoidance object. If it has directly been obtained, it is determined that the computation accuracy of the position of the avoidance object is high.

If, on the other hand, it has not directly been obtained, the distance between the own vehicle and the avoidance object is compared with the distance threshold that is preset as a judgment value for judging the computation accuracy of the avoidance object. If, as a result of the comparison, the distance between the own vehicle and the avoidance object is equal to or lower than the distance threshold, it is determined that the computation accuracy of the position of the avoidance object is high. On the other hand, if the comparison result shows that the distance between the own vehicle and the avoidance object is greater than the distance threshold, it is determined that the computation accuracy of the position of the avoidance object is low. The distance threshold mentioned above is set as a value to distinguish a near distance from a far distance between the own vehicle and the avoidance object and is a value in the range of, for example, about 60 m to 100 m.

The computation accuracy of the moving amount of the avoidance object will be explained. If it is determined that the computation accuracy of the position of the avoidance object and that of the moving amount of the own vehicle are each high, it is determined that the computation accuracy of the moving amount of the avoidance object is high. On the other hand, if it is determined that one or both of the computation accuracy of the position of the avoidance object and that of the moving amount of the own vehicle is low, it is determined that the computation accuracy of the moving amount of the avoidance object is low.

An example of judging the computation accuracy of the moving amount of the own vehicle will be explained. If it is determined with, for example, a slip sensor that the own vehicle is running on a slippery road, the vehicle speed and steering angle obtained with the speed sensor and steering encoder frequently differ from actual ones. In this case, the computation accuracy of the moving amount of the own vehicle computed according to the vehicle speed and steering angle is determined to be low. If, on the other hand, it is determined that the own vehicle is not running on a slippery road, the vehicle speed and steering angle obtained with the speed sensor and steering encoder substantially agree with actual ones. In this case, the computation accuracy of the moving amount of the own vehicle computed according to the vehicle speed and steering angle is determined to be high.

In FIG. 4, avoidance objects with respect to the own vehicle are a vehicle 1 and a vehicle 2 that run in front of the own vehicle. If the recognition level, i.e. the detection accuracy of a relative position and the computation accuracy of a relative moving amount, of each avoidance object is the highest, a driving strategy 4 corresponding to the relative position and relative moving amount of each avoidance object is executed. Namely, it is assumed that each object is moving at the detected speed, and according to this assumption, driving control to avoid the object is carried out. The highest recognition level means that the detection accuracy of the relative position and relative moving amount of each avoidance object is high at any of the near and far distances. Executing the driving strategy 4 leads to properly avoiding each avoidance object according to the relative position and relative moving amount of the object. This prevents excessively small or large avoidance and realizes safety driving.

Figure 5:
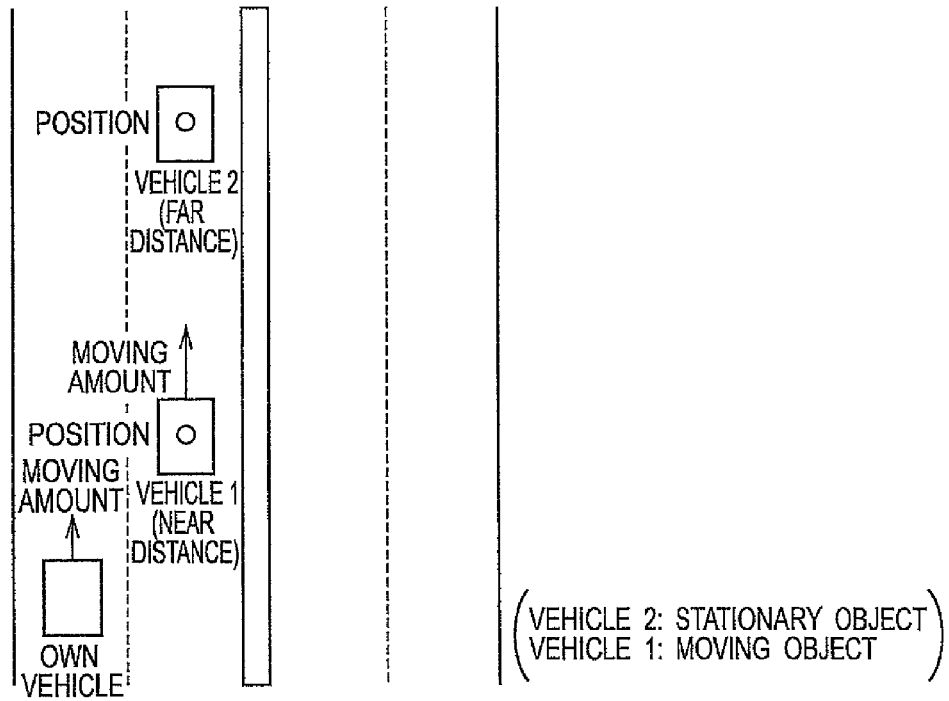
FIG. 5 is a view illustrating an example of a peripheral condition around the own vehicle when executing a driving strategy 3 according to Embodiment 1 of the present invention.

In FIG. 5, it is determined that the computation accuracy of the moving amount of the avoidance object existing at a far distance is low. In this case, a driving strategy 3 illustrated in FIG. 3 is executed. The driving strategy 3 takes the relative position and relative moving amount of the object existing at a near distance into consideration. In connection with the object existing at a far distance, the driving strategy considers only the relative position thereof and assumes that it is a stationary object when conducting avoidance control. A relative distance of the far object from the own vehicle is long and it takes a time until a collision occurs, and therefore, the object is avoidable by recognizing it as a stationary object. Even if the object approaches the own vehicle at a large relative speed, avoidance control is possible by treating the object as a near-distance object when the relative distance is shortened after a predetermined time.

Figure 6:
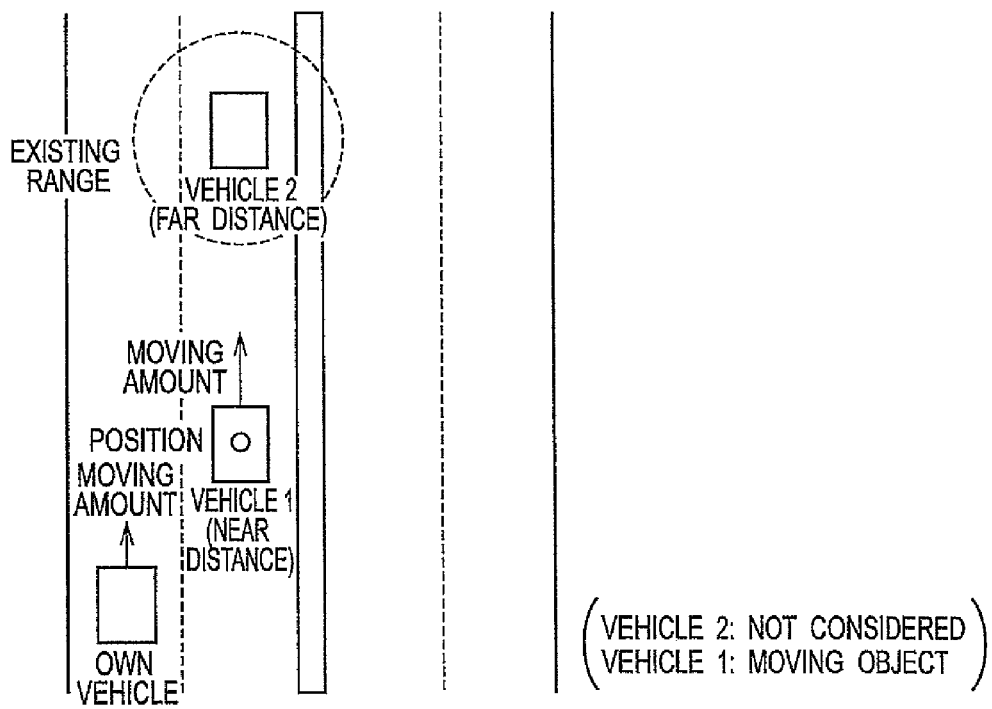
FIG. 6 is a view illustrating an example of a peripheral condition around the own vehicle when executing a driving strategy 2 according to Embodiment 1 of the present invention.

In FIG. 6, the computation accuracy of the relative position and relative moving amount of the object existing at a far distance is low and the computation accuracy of the relative position and relative moving amount of the object existing at a near distance is high. In this case, a driving strategy 2 illustrated in FIG. 3 is executed. The driving strategy 2 takes the relative position and relative moving amount of the near-distance object into consideration. In this case, the computation accuracy of the relative position and relative moving amount of the far-distance object is low. Accordingly, if the relative position and relative moving amount of the far-distance object are taken into consideration, it is highly possible to restrict a moving range of the own vehicle. Therefore, no avoidance is made for the far-distance object.

Figure 7:
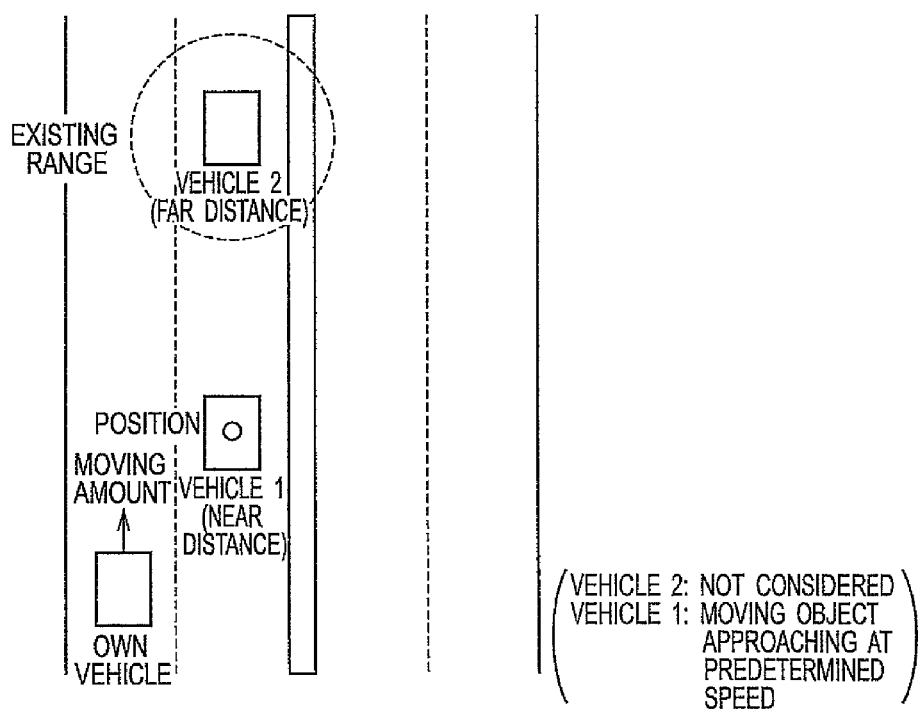
FIG. 7 is a view illustrating an example of a peripheral condition around the own vehicle when executing a driving strategy 1 according to Embodiment 1 of the present invention.

In FIG. 7, only the computation accuracy of the relative position of the object existing at a near distance is high. In this case, a driving strategy 1 illustrated in FIG. 3 is executed. The driving strategy 1 takes the relative position of the near-distance object into consideration. Since the computation accuracy of the moving amount of the near-distance object is low, the strategy is unable to determine a proper avoidance amount. Accordingly, for the near-distance object, the driving strategy 1 avoids the same as an object that approaches at a predetermined relative speed. The predetermined relative speed is, for example, two times as fast as the speed of the own vehicle. This results in doubling a collision time when the near-distance object is a stationary object. When the object approaches at the same speed, a proper collision time will be secured.

Figure 8:
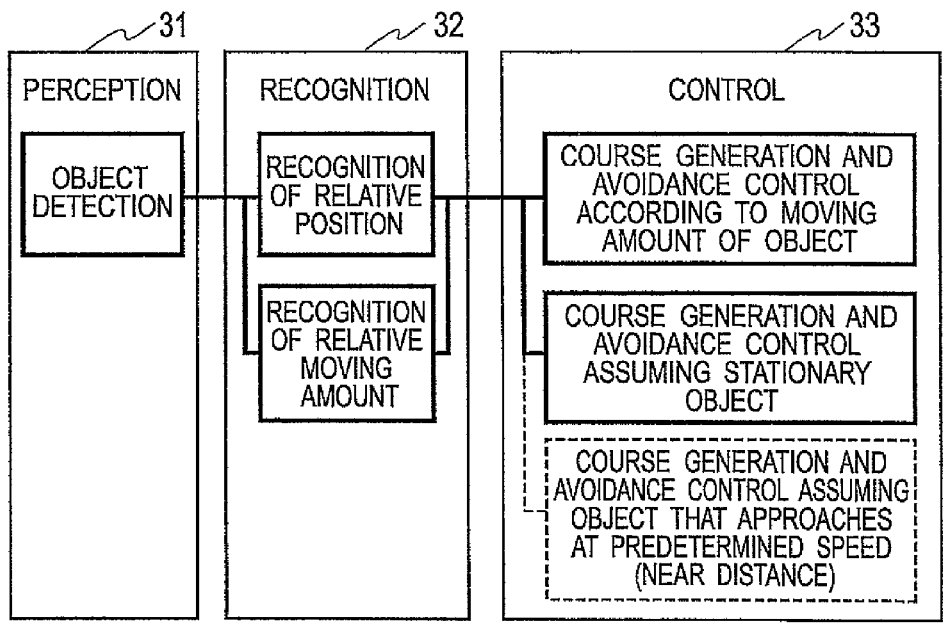
FIG. 8 is a view illustrating a system configuration to execute the driving strategy 3.

Returning to FIG. 2, a driving strategy is determined as mentioned above, and thereafter, a system configuration that is able to realize the determined driving strategy is determined (step S108). As mentioned before, the system configuration database 17 stores the system configurations including the details of the perception, recognition, and control function blocks to realize the driving strategies and the connection relationships of the function blocks. If, for example, only a radar is used to detect an object as mentioned above, system configurations to realize the driving strategies explained in connection with the step S107 of FIG. 2 involve the function blocks and connection relationships mentioned below. FIG. 8 illustrates a system configuration to realize the driving strategy 3 and FIG. 9 illustrates a system configuration to realize the driving strategy 1. In each of these drawings, a part encircled with a dotted line are a function block and connection relationship that are included in the system as a whole but are not used when configuring a system to realize the corresponding driving strategy.

In the system configuration illustrated in FIG. 9 to realize the driving strategy 1, a perception function block 31 includes a function of detecting an object with the radar and a recognition function block 32 includes a function of recognizing a relative position. A control function block 33 includes a function of generating a course for the object that is at a near distance and approaches at a predetermined speed and a function of conducting avoidance control.

In the system configuration to realize the driving strategy 2, the perception function block includes the function of detecting an object with the radar and the recognition function block includes the function of recognizing a relative position and a function of recognizing a relative speed. The control function block includes, for a near-distance object, the function of generating a course according to a moving amount of the object and the function of conducting avoidance control.

In the system configuration illustrated in FIG. 8 to realize the driving strategy 3, the perception function block 31 includes the function of detecting an object with the radar and the recognition function block 32 includes the function of recognizing a relative position and the function of recognizing a relative speed. The control function block 33 includes, for a near-distance object, the function of generating a course according to a moving amount of the object and the function of conducting avoidance control. For a far-distance object, it includes a function of generating a course on an assumption that the object is a stationary object and the function of conducting avoidance control.

The system configuration to realize the driving strategy 4, the perception function block includes the function of detecting an object with the radar and the recognition function block includes the function of recognizing a relative position and the function of recognizing a relative speed. The control function block includes, for each of near- and far-distance objects, the function of generating a course according to a moving amount of the object and the function of conducting avoidance control.

Returning to FIG. 2, a system configuration is determined as mentioned above, and thereafter, a system reconfiguration is carried out according to a change in the driving strategy (step S109). If the function blocks are realized by use of software, function blocks to be used are chosen and ways of transferring variables among the function blocks are changed.

For example, the driving strategy 3 detects objects with the radar, and according to the detection result, recognizes the relative position and relative moving amount of each object. For a near-distance object whose moving amount computation accuracy is high, a system is configured to carry out avoidance control according to the moving amount of the object. For a far-distance object whose moving amount computation accuracy is low, a system is configured to carry out avoidance control according to an assumption that the object is stationary. If, in the next control cycle, the driving strategy is changed from 3 to 1, object are detected with the radar as mentioned above. As a result of computation of the relative position and relative moving amount of each object, only the relative position is recognized for a near-distance object. Then, the system is reconfigured to carry out avoidance control on an assumption that the object approaches at a predetermined speed.

It is possible to change connection relationships among the function blocks by changing hardware. For example, as illustrated in FIG. 10, the perception function block 31, recognition function block 32, and control function block 33 are constituted in advance by hardware and are connected to one another. Function blocks to control these blocks are established by software and the software is manipulated to realize a system reconfiguration.

When achieving autonomous driving control on the own vehicle, unconformity may occur between control instruction values for driving strategies when a system configuration is changed. For this, a control instruction value of the previous time must be considered to determine a control instruction value of this time. In connection with this, after the system reconfiguration of the step S109, it is tested whether or not a solution of a control instruction value is present (step S110).

To achieve this, a motion vector (indicating the speed and direction of the own vehicle) of the previous control instruction value and a motion vector of the control instruction value of this time may be matched with each other in at least one of the speed and direction. FIG. 11 illustrates an example of a control instruction value change when the driving strategy 3 is changed to the driving strategy 1. The previous control cycle illustrated in FIG. 11(*a*) adopts the driving strategy 3 that sets an avoidance course on the right side of the traveling direction of the own vehicle. Then, the control cycle of this time illustrated in FIG. 11(*b*) adopts the driving strategy 1 that makes no consideration of the far-distance vehicle 2. In this case, the driving strategy 1 after the change may have two avoidance courses on the left and right sides of the traveling direction of the own vehicle. Since the previous avoidance course is set on the right side of the traveling direction of the own vehicle, matching is realized by choosing the right avoidance course for this time.

In this way, if an avoidance course is determined and a solution for a control instruction value is obtained, the control instruction value is outputted to control the speed, steering angle, and the like of the own vehicle so that the own vehicle may autonomously run on the determined avoidance course (step S111). On the other hand, if no solution for a control instruction value is obtained, information is provided to prompt the driver to carry out a driving operation on his/her own (step S112). In a driving environment in which a plurality of objects exist, a system configuration to realize a combination of the above-mentioned processes (driving strategies) is made to execute driving control appropriate for a given driving scene.

As explained above, Embodiment 1 detects an avoidance object existing around the own vehicle, recognizes the relative position and relative moving amount of the avoidance object, and according to recognition levels, carries out autonomous driving control to avoid the avoidance object. This expands scenes for which avoidance control is achievable and enables proper avoidance control to be carried out for a given scene.

The embodiment senses and recognizes an object existing around the own vehicle and achieves autonomous driving control according to whether or not a moving amount of the object has been obtained and according to the recognition accuracy of the moving amount. Even if the sensing or recognition accuracy is insufficient, the embodiment is capable of diminishing a situation that autonomous driving control is impossible.

The embodiment may change a combination of the perception, recognition, and control function blocks to another, to establish a system configuration whose effectuation is guaranteed.

The embodiment defines each driving strategy according to the accuracy of the position of an avoidance object and the accuracy of a moving amount. This prevents a system from being excessively complicated and guarantees the safety of driving.

The embodiment avoids an avoidance object at the timing defined by a predetermined collision time and a vehicle-to-vehicle time interval that are based on a recognition state of the moving amount of the avoidance object. This guarantees a predetermined safety margin for driving control.

If an avoidance object is detected at a near distance from the own vehicle and if it is determined that the computation accuracy of a moving amount of the avoidance object is low, the embodiment avoids the avoidance object by recognizing it as an object that approaches at a predetermined speed. This guarantees a safety margin larger than a real one for driving control.

If an avoidance object is detected at a far distance from the own vehicle and if it is determined that the computation accuracy of a moving amount of the avoidance object is low, the embodiment avoids the avoidance object by recognizing it as a stationary object. This prevents a sudden avoidance action from being conducted on an object having a low collision risk.

When changing a driving strategy to another, the embodiments outputs a control instruction value whose motion vector is similar to that of a control instruction value outputted before the change. This suppresses a strange feeling felt by the driver at the time of system reconfiguration during autonomous driving control.

Embodiment 2

FIG. 12 illustrates a configuration of a vehicle autonomous driving control system according to Embodiment 2 of the present invention. Embodiment 2 differs from Embodiment 1 in that it employs a new driving strategy determination unit 20 instead of the driving strategy determination unit 14. The driving strategy determination unit 20 has a new system operation level judgment part 21 instead of the system operation level judgment part 16 adopted by Embodiment 1. The system operation level judgment part 21 has a position accuracy judgment part of own vehicle 22 in addition to a recognition state judgment part 18 that is similar to that of Embodiment 1. Parts other than these parts of Embodiment 2 are the same as those of Embodiment 1, and therefore, explanations thereof are omitted.

The driving strategy determination unit 20 has, in addition to the functions possessed by the driving strategy determination unit 14 adopted by Embodiment 1, a function of determining, according to the detection accuracy of a position of the own vehicle judged by the position accuracy judgment part of own vehicle 22, a driving strategy including driving control to a predetermined destination.

The system operation level judgment part 21 has, in addition to the recognition state judgment part 18 that is similar to that of Embodiment 1, the position accuracy judgment part of own vehicle 22. The system operation level judgment part 21 has, in addition to the function of the system operation level judgment part 16, a function achieved by the position accuracy judgment part of own vehicle 22 of judging the detection accuracy of a position of the own vehicle detected with, for example, GPS.

If the position of the own vehicle is detected in the order of a first threshold that is preset as a judgment value to judge a detection accuracy level of the position of the own vehicle, the position accuracy judgment part of own vehicle 22 judges that the detection accuracy of the position of the own vehicle is high. If the position of the own vehicle is detected in the order of a second threshold that is preset as a judgment value to judge a detection accuracy level of the position of the own vehicle, the position accuracy judgment part of own vehicle 22 judges that the detection accuracy of the position of the own vehicle is low. The order of the first threshold for a detection value is set to the order of several centimeters and the order of the second threshold for a detection value is set to the order of several meters.

Figure 13:
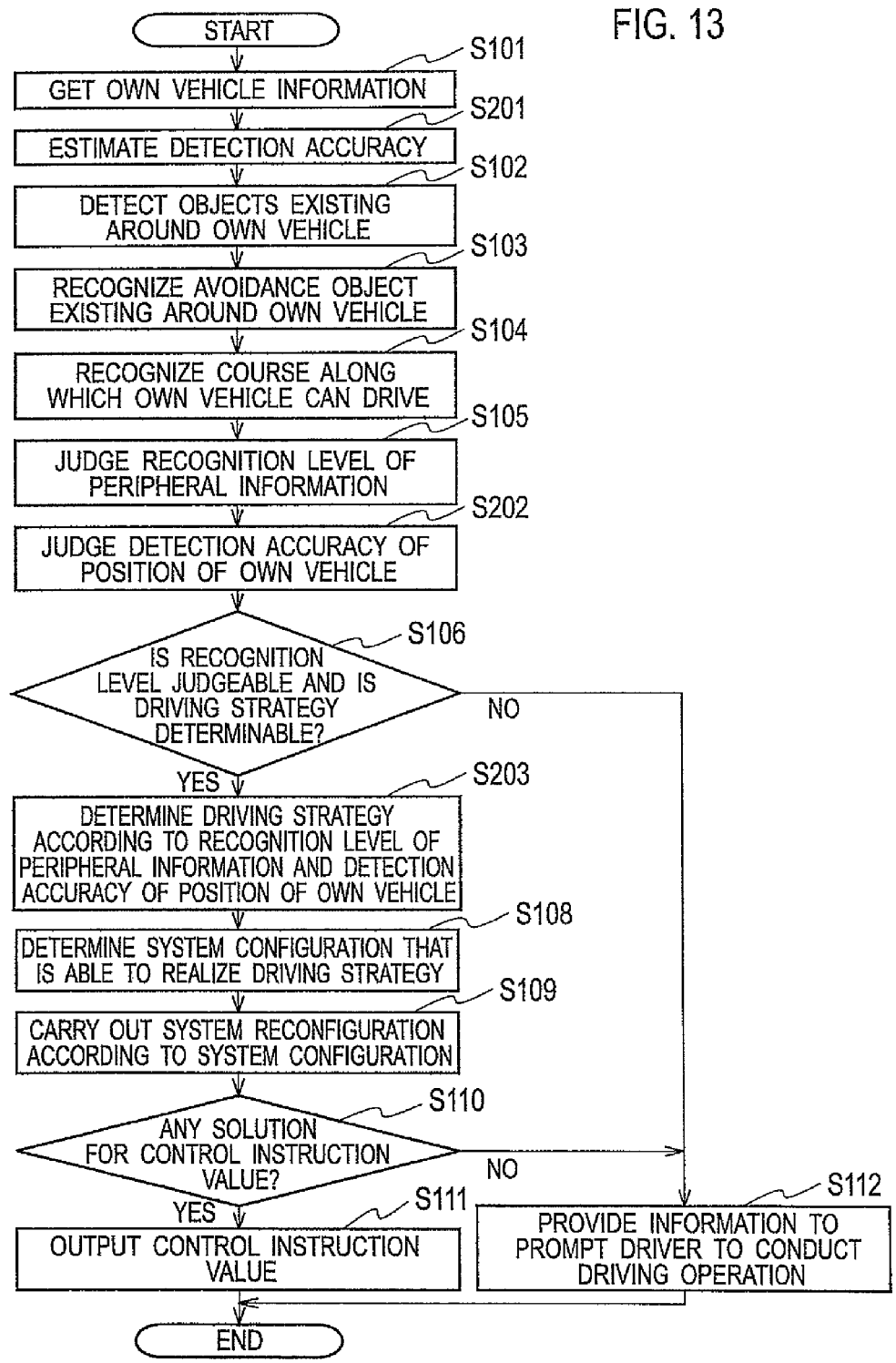
FIG. 13 is a flowchart illustrating a sequence of driving control processes according to Embodiment 2 of the present invention.

A sequence of autonomous driving control according to Embodiment 2 will be explained with reference to the flowchart of FIG. 13. The sequence in the flowchart of FIG. 13 additionally includes steps S201 to S203 in addition to the sequence in the flowchart of FIG. 2, and therefore, overlapping explanations of steps S101 to S112 are omitted. The steps S201 and S202 estimate the detection accuracy of a position of the own vehicle and judges the accuracy. The step S203 determines a driving strategy according to a recognition level of peripheral information and the detection accuracy of the position of the own vehicle. As a concrete example, combinational control of avoiding an avoidance object according to the detection accuracy of the position of the own vehicle and a recognition level of the avoidance object and guiding the own vehicle to a destination will be explained. A system reconfiguration to realize such combinational control will also be explained.

In FIG. 2, the step S101 detects the position of the own vehicle as one of vehicle information pieces. At this time, the detection accuracy is estimated (step S201). For example, if GPS is used to detect the position of the own vehicle, information about the number of satellites that catch the own vehicle is obtainable. According to this information, the detection accuracy of the position of the own vehicle is estimated. Namely, it is presumed that the detection accuracy becomes higher as the number of satellites that catch the vehicle becomes larger. If no slippage occurs during driving, a position calculated from a last position of the own vehicle and the moving amount and steering angle of the own vehicle is compared with the position of the own vehicle detected this time. A result of the comparison is used to estimate the detection accuracy of the position of the own vehicle. For example, there are a position of the own vehicle detected in a previous control cycle (FIG. 14(a)) and a position of the own vehicle detected in this control cycle (FIG. 14(b)). The detection accuracy of the position of the own vehicle of this time is estimated to be more accurate as the difference between the position calculated from the moving amount and steering angle of the own vehicle and the position actually detected with, for example, a radar becomes smaller.

After the estimation of the detection accuracy of the position of the own vehicle, the steps S102 to S105 are carried out like Embodiment 1 to find a driving course around the own vehicle, recognize the avoidance object, and judge a recognition level of the peripheral information.

The detection accuracy of the position of the own vehicle is judged in step S202. This judgment sets, for example, at least two detection levels mentioned below with respect to the detection accuracy estimated in the step S201. If the detection accuracy of the position of the own vehicle is in the order of, for example, several meters, the detection accuracy is at a low-accuracy detection level (level 1). If it is in the order of, for example, several centimeters, the detection accuracy is at a high-accuracy detection level (level 2). The low-accuracy detection level (level 1) may further be divided. For example, if the position of the own vehicle is undetectable and is estimated by complementary operation using map matching of a car navigation system, the detection accuracy is determined to be at a level 0 that is worse than the level 1.

If the step S106 determines that a recognition level of the peripheral information is judgeable and a driving strategy determinable, a driving strategy is determined according to the recognition level of the peripheral information and the detection accuracy of the position of the own vehicle (step S203).

As illustrated in FIG. 15, the system configuration database 17 stores in advance driving strategies 1-1 to 4-2 and system configurations to realize these driving strategies, corresponding to recognition levels and the detection accuracy values of the position of the own vehicle. Compared with that of Embodiment 1, the system configuration database 17 according to Embodiment 2 takes the detection accuracy of the position of the own vehicle into consideration. Namely, in FIG. 15, the driving strategies 1-1, 2-1, 3-1, and 4-1 are similar to the driving strategies 1, 2, 3, and 4 and each conduct driving control to avoid an avoidance object. Accordingly, the driving strategies other then the driving strategy 1-1 carry out driving control to move to a destination and avoid an object in combination. The driving strategies 1-2, 2-2, 3-2, and 4-2 carry out, in addition to the operations of the driving strategies illustrated in FIG. 3, an operation of generating a moving course to a destination.

If the detection accuracy of the position of the own vehicle is high, the reliability of the position of the own vehicle is high. Accordingly, moving to a predetermined destination as illustrated in FIG. 16(a), for example, is realized by accurately generating a course to the destination. In this case, if there is an avoidance object, it is possible to properly avoid the avoidance object and move to the destination. Accordingly, if the detection accuracy of the position of the own vehicle is high, avoiding an avoidance object and moving to a destination are combined when determining a driving strategy.

On the other hand, if the detection accuracy of the position of the own vehicle is low, the reliability of the position of the own vehicle is low. Accordingly, even if a course to a predetermined destination is generated as illustrated in FIG. 16(b), a possibility of moving as planed is low. Namely, if the present position of the own vehicle is incorrect, a course to be generated to the destination is not correct, and therefore, there is a possibility of generating an erroneous control instruction value. Accordingly, if the detection accuracy of the position of the own vehicle is low, a driving strategy only to avoid an avoidance object is adopted. If the detection accuracy of the position of the own vehicle changes from low to high during driving, the driving strategy is changed to an integrated driving strategy that avoids the avoidance object and also guides the own vehicle to a destination.

A system configuration to realize the determined driving strategy is determined and is reconfigured in a similar fashion to Embodiment 1. Thereafter, a control instruction value to control the vehicle is outputted to execute autonomous driving control according to the determined driving strategy. If no driving strategy is determined or no solution for a control instruction value is obtained, information is provided to prompt the driver to carry out a driving operation.

As explained above, if the detection accuracy of the position of the own vehicle is high, the present embodiment generates a moving course to a destination and avoids an avoidance object. If the detection accuracy of the position of the own vehicle is low, the present embodiment only avoids the avoidance object. In addition to achieving the effect of Embodiment 1, Embodiment 2 surely avoids an avoidance object and safely guides the own vehicle to a destination.

If the position of the own vehicle is not accurately detected, the embodiment temporarily switches driving control to only avoid an avoidance object. Namely, if the detection accuracy of the position of the own vehicle is low, the embodiment first avoids the avoidance object, thereby guaranteeing the safety of driving.

If the state in which the detection accuracy of the position of the own vehicle is low changes to a state in which the same is high, the embodiment switches the driving control to carry out avoiding the avoidance object and guiding the own vehicle to a destination in combination. This avoids the avoidance object, and at the same time, drives the own vehicle to the destination along a smooth driving course.

According to the present invention, a driving strategy to avoid an avoidance object is determined according to the recognition states of the position and moving amount of the avoidance object. This results in increasing the chances of executing autonomous driving control and carrying out autonomous driving control suitable for driving environments.

The invention claimed is:

1. An autonomous driving control system for a vehicle for detecting the positions of an own vehicle and an avoidance object existing around the own vehicle, determining a course to a destination, and carrying out autonomous driving control, comprising:
    a driving strategy determination unit programmed to determine computing accuracy levels of a position and computing accuracy levels of a moving amount of the avoidance object of at least either high or low, and further programmed to determine a driving strategy to avoid the avoidance object according to a distance between the own vehicle and the avoidance object and the computation accuracy levels of a position and moving amount of the avoidance object, wherein
    the autonomous driving control system is programmed to control the own vehicle according to a control instruction value that is determined to execute autonomous driving control on the own vehicle and corresponds to the driving strategy determined by the driving strategy determination unit.

2. The autonomous driving control system for a vehicle according to claim 1, wherein
    the driving strategy determination unit is programmed to determine that the computation accuracy of the position of the avoidance object is high and the avoidance object is at a distance nearer than a threshold value and that the computation accuracy of the moving amount of the avoidance object is low, and
    the driving strategy determination unit is further programmed to determine a driving strategy to avoid the avoidance object as an object that approaches at a predetermined speed.

3. The autonomous driving control system for a vehicle according to claim 2, wherein
    the driving strategy determination unit is programmed to determine that the computation accuracy of the position of the avoidance object is high and the avoidance object is at a distance nearer than the threshold value and that the computation accuracy of the moving amount of the avoidance object is high, and
    the driving strategy determination unit is further programmed to determine a driving strategy to avoid the avoidance object as an object that moves at a detected speed.

4. The autonomous driving control system for a vehicle according to claim 1, wherein
the driving strategy determination unit is programmed to determine that the computation accuracy of the position of the avoidance object is high and the avoidance object is at a distance farther than a threshold value and that the computation accuracy of the moving amount of the avoidance object is low, and
the driving strategy determination unit is further programmed to determine a driving strategy to avoid the avoidance object as an object that is stationary.

5. The autonomous driving control system for a vehicle according to claim 4, wherein
the driving strategy determination unit is programmed to determine that the computation accuracy of the position of the avoidance object is high and the avoidance object is at a distance farther than the threshold value and that the computation accuracy of the moving amount of the avoidance object is high, and
the driving strategy determination unit is further programmed to determine a driving strategy to avoid the avoidance object as an object that moves at a detected speed.

6. The autonomous driving control system for a vehicle according to claim 1, wherein the driving strategy determination unit has:
a system configuration database that that is programmed to store the computation accuracy of a position of the avoidance object, the computation accuracy of a moving amount thereof, and a system configuration to execute a driving strategy corresponding to these pieces of computation accuracy; and
a system operation level judgment part that is programmed to judge and determine a system configuration to execute autonomous driving control according to the computation accuracy of the position of the avoidance object and the computation accuracy of the moving amount thereof.

7. The autonomous driving control system for a vehicle according to claim 6, wherein the driving strategy determination unit is programmed to judge that:
(i) the computation accuracy of the position of the avoidance object is high based on the position of the avoidance object being directly obtained and based on the avoidance object and own vehicle being detected at a distance equal to or lower than a distance threshold;
(ii) the computation accuracy of the position of the avoidance object is low based on the position of the avoidance object being not directly obtained and based on the avoidance object and own vehicle being detected at a distance greater than the distance threshold;
(iii) the computation accuracy of the moving amount of the avoidance object is high if it based on judgments that the computation accuracy of the position of the avoidance object and that of a moving amount of the own vehicle are high; and
(iv) the computation accuracy of the moving amount of the avoidance object is low based on judgment that the computation accuracy of at least one of the position of the avoidance object and the moving amount of the own vehicle is low.

8. The autonomous driving control system for a vehicle according to claim 6, wherein the driving strategy determination unit is programmed to judge that:
the detection accuracy of the moving amount of the own vehicle is high based on the own vehicle not driving on a slippery road; and
the detection accuracy of the moving amount of the own vehicle is low based on the own vehicle driving on a slippery road.

9. The autonomous driving control system for a vehicle according to claim 7, wherein:
the system operation level judgment part has an position accuracy judgment part of own vehicle, the position accuracy judgment part of own vehicle is programmed to judge
that the detection accuracy of a position of the own vehicle is high based on the position of the own vehicle being detected in the order of a first threshold that is preset as a judgment value to judge a detection accuracy level of the position of the own vehicle and
that the detection accuracy of the position of the own vehicle is low based on the position of the own vehicle being detected in the order of a second threshold that is preset as a judgment value to judge a detection accuracy level of the position of the own vehicle; and
the driving strategy determination unit is programmed to determine a driving strategy involving driving control to a predetermined destination according to the detection accuracy of the position of the own vehicle judged by the position accuracy judgment part of own vehicle.

10. The autonomous driving control system for a vehicle according to claim 7, wherein the driving strategy determination unit is programmed to avoid the avoidance object according to a recognition state of the moving amount of the avoidance object at the timing determined by a predetermined collision time and vehicle-to-vehicle time interval.

11. The autonomous driving control system for a vehicle according to claim 9, wherein
the position accuracy judgment part of own vehicle is programmed to determine that the detection accuracy of the position of the own vehicle is low, and
the driving control to the predetermined destination is programmed to be suspended for a judged period and only the driving control to avoid the avoidance object is programmed to be carried out.

12. The autonomous driving control system for a vehicle according to claim 11, wherein
the detection accuracy of the position of the own vehicle is judged to be low and only the driving control to avoid the avoidance object is carried out,
the suspended driving control to the destination is programmed to resume, and
the detection accuracy of the position of the own vehicle is judged to have been changed from low to high and is updated accordingly.

13. The autonomous driving control system for a vehicle according to claim 1, wherein
the driving strategy determined by the driving strategy determination unit is changed,
control instruction values corresponding to a plurality of candidate driving strategies to be chosen after the change include a control instruction value that contains a motion vector that is similar to a motion vector of the own vehicle contained in a control instruction value corresponding to the driving strategy executed before the change, and
a control instruction value to be selected after the change is programmed to contain the similar motion vector.

14. The autonomous driving control system for a vehicle according to claim 1 further comprising:
a vehicle information acquisition unit programmed to acquire at least the position, speed, and steering angle of the own vehicle;

an avoidance object detection unit programmed to detect the avoidance object from among objects existing around the own vehicle and detecting a distance and an angle between the detected avoidance object and the own vehicle; and a peripheral information recognition unit programmed to recognize a driving course along which the own vehicle can drive, to compute the position of the avoidance object with respect to the own vehicle according to the position of the own vehicle acquired by the vehicle information acquisition unit and the distance and angle between the avoidance object and the own vehicle detected by the avoidance object detection unit, and to compute the moving amount of the avoidance object according to the computed position of the avoidance object and a moving amount of the own vehicle computed according to the speed and steering angle of the own vehicle acquired by the vehicle information acquisition unit.

15. An autonomous driving control system for a vehicle for detecting the positions of an own vehicle and objects existing around the own vehicle, determining a course to a destination, and carrying out autonomous driving control, characterized in that the system includes:

a vehicle information acquisition means for acquiring at least the position, speed, and steering angle of the own vehicle;

an avoidance object detection means for detecting an avoidance object from among the objects existing around the own vehicle and detects a distance and an angle between the detected avoidance object and the own vehicle;

a peripheral information recognition means for recognizing a driving course along which the own vehicle can drive, for computing a position of the avoidance object with respect to the own vehicle according to the position of the own vehicle acquired by the vehicle information acquisition means and the distance and angle between the avoidance object and the own vehicle detected by the avoidance object detection means, and for computing a moving amount of the avoidance object according to the computed position of the avoidance object and a moving amount of the own vehicle computed according to the speed and steering angle of the own vehicle acquired by the vehicle information acquisition means;

a driving strategy determination means for determining the computation accuracy of the position of the avoidance object according to a comparison result of the distance between the own vehicle and the avoidance object with a distance threshold and whether or not the position of the avoidance object has been directly obtained, for determining the computation accuracy of the moving amount of the avoidance object according to the computation accuracy of the position of the avoidance object and that of the moving amount of the own vehicle, and for determining a driving strategy to specify driving control to avoid the avoidance object according to the computation accuracy of each of the position and moving amount of the avoidance object; and a control instruction value determination means for determining and outputting a control instruction value to control the own vehicle so that autonomous driving control corresponding to the driving strategy determined by the driving strategy determination means is executed on the own vehicle.

* * * * *